(12) United States Patent
Adenot et al.

(10) Patent No.: US 9,212,749 B2
(45) Date of Patent: Dec. 15, 2015

(54) FLOW CONTROL VALVE FOR AN INTERNAL COMBUSTION ENGINE

(75) Inventors: Sébastien Adenot, Pontoise (FR); Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 94 days.

(21) Appl. No.: 13/703,908

(22) PCT Filed: Jun. 27, 2011

(86) PCT No.: PCT/FR2011/051487
§ 371 (c)(1),
(2), (4) Date: Mar. 1, 2013

(87) PCT Pub. No.: WO2012/001284
PCT Pub. Date: Jan. 5, 2012

(65) Prior Publication Data
US 2013/0161551 A1    Jun. 27, 2013

(30) Foreign Application Priority Data
Jun. 30, 2010    (FR) ...................................... 10 02775

(51) Int. Cl.
F16K 1/226     (2006.01)
F16K 1/22      (2006.01)
F16K 27/02     (2006.01)
F02D 9/10      (2006.01)
F02M 25/07     (2006.01)

(52) U.S. Cl.
CPC .............. F16K 1/2263 (2013.01); F02D 9/104 (2013.01); F02M 25/0793 (2013.01); F16K 1/22 (2013.01); F16K 27/0218 (2013.01); Y02T 10/121 (2013.01)

(58) Field of Classification Search
CPC ..... F16K 1/2263; F16K 1/22; F16K 27/0218; F02D 9/104; F02M 25/0793; Y02T 10/121; Y10T 137/484

USPC ........... 123/337; 251/305, 306, 308; 137/484, 137/601.17
See application file for complete search history.

(56) References Cited

U.S. PATENT DOCUMENTS 4,296,915 A * 10/1981 Baumann ...................... 251/174
6,006,722 A * 12/1999 Hall ............................... 123/337
(Continued)

FOREIGN PATENT DOCUMENTS

DE    43 19 015 A1    12/1994
FR    2 933 469 A1    1/2010
(Continued)

OTHER PUBLICATIONS

International Search Report issued in PCT/FR2011/051487 mailed Oct. 17, 2011 (6 pages).
(Continued)

*Primary Examiner* — John K Fristoe, Jr.
*Assistant Examiner* — Michael R Reid
(74) *Attorney, Agent, or Firm* — Osha Liang LLP

(57) ABSTRACT

The invention relates to a fluid valve, in particular for the exhaust gas from a motor vehicle, comprising: a body (30) defining at least one duct (32), and a movable flap that can rotate about a shaft between a closed position preventing the fluid from flowing through the duct (32) and an open position allowing the fluid to flow through the duct (32). According to the invention, the valve includes an opening clearance (E) between flap and a wall (62) of the body (30) for the passage of the fluid, said clearance (E) extending in a direction parallel to the pivot shaft of the flap over a length that varies according to the angular position of the flap.

10 Claims, 3 Drawing Sheets

(56) References Cited

U.S. PATENT DOCUMENTS

| | | | |
|---|---|---|---|
| 6,186,115 B1 * | 2/2001 | Nishimura et al. | 123/337 |
| 2002/0109117 A1 | 8/2002 | Garrick et al. | |
| 2007/0246009 A1 | 10/2007 | Suzuki et al. | |
| 2008/0296525 A1 * | 12/2008 | Albert | 251/129.11 |
| 2010/0148107 A1 * | 6/2010 | Keller-Staub | 251/306 |

FOREIGN PATENT DOCUMENTS

| | | |
|---|---|---|
| JP | 2002-317656 A | 10/2002 |
| WO | 2010/000752 A1 | 1/2010 |

OTHER PUBLICATIONS

Kneppers et al.: "Valve ststem for controlling fluid flow" Research Disclosure, Mason Publications, Hampshire, GB, vol. 474, No. 63, 1 Oct. 2003 (5 pages).

Written Opinion of the International Searching Authority issued in PCT/FR2011/051487 mailed on Oct. 17, 2011 (5 pages).

International Preliminary Report on Patentability from PCT/FR2011/051487 issued on Jan. 8, 2013 (6 pages).

Office Action in corresponding Japanese Patent Application No. 2013-517449 mailed Feb. 17, 2015 (4 pages).

* cited by examiner

FLOW CONTROL VALVE FOR AN INTERNAL COMBUSTION ENGINE

The present invention concerns a fluid circulation valve. It may notably be for the exhaust gas from an automobile vehicle motor, air to be admitted to the motor or a mixture of air and exhaust gas.

Said valve could also serve to adjust a flow of exhaust gas to be recirculated to the air admission line of the motor. In particular, it could be used in motor architectures, notably turbocharged diesel motor architectures, said valve being provided on the exhaust line of the motor downstream of the turbine of the turbocharger to bleed some of the gas. It could also serve as a metering valve, being positioned along the air admission line or the exhaust gas recirculation line.

There are currently known valves comprising a body defining a duct and a flap that can rotate about a shaft between a so-called closed position preventing the flow of the fluid in the duct and an open position allowing the fluid to flow in through the duct.

A problem encountered with the known valves is the excessively fast increase of the flow rate during the first degrees of opening of the flap. As soon as the flap begins to leave its closed position, the area that is freed up for the fluid to pass through increases rapidly. The facility for progressive opening is therefore limited, which restricts the uses of the valve and complicates controlling it.

The invention proposes to alleviate the aforementioned drawbacks and concerns a fluid valve, in particular for the exhaust gas from an automobile vehicle, comprising a body defining at least one duct and a movable flap that can rotate about a shaft between a so-called closed position preventing the fluid from flowing through the duct and an open position allowing the fluid to flow through the duct.

According to the invention, the valve includes an opening clearance between flap and a wall of the body for the passage of the fluid, said clearance extending in a direction parallel to the pivot shaft of the flap over a length that varies according to the angular position of the flap.

The area left free for the fluid to pass through can therefore be adjusted as a function of progressivity requirements. In particular, it could be adjusted so that, during the first degrees of opening of the flap, the area increases as progressively as possible without any longer being a function only of the perimeter of the flap.

In various embodiments:
the length of the opening clearance obeys one or more of the following laws:
  the length of the clearance is zero in the closed position of the flap,
  the length of the clearance increases with an angle of opening of the flap,
  the length of the clearance increases in a manner that is not proportional to the angle of opening of the flap,
  the length of the clearance increases faster at the commencement of the opening of the flap than at the end,
  the length of the clearance is maximum in the maximum open position of the flap;
said wall comprises a first portion with which the flap is in contact between its open position and its closed position and a second portion extending in the direction of the pivot shaft of the flap from said first portion, said second portion being less concave than said first portion so as to define said opening clearance;
the rotation shaft of the flap is off-center and the flap is oriented in a plane tangential to a cylinder centered on said shaft;
said first portion has a profile inscribed within a cylinder the axis whereof is the rotation axis of the flap;
the valve comprises a main duct and an auxiliary duct for the flow of the fluid, said auxiliary duct extending from said main duct, the flap being adapted to prevent communication between the two ducts in the closed position and to allow communication between said ducts in the open position;
said wall between which and the flap said opening clearance is provided is situated at the level of said auxiliary duct;
said flap has an edge oriented along said pivot shaft at the level of which said opening clearance is provided and said edge is straight, the wall between which and said straight edge said opening clearance is provided being configured to define said clearance;
said flap has a first, so-called gate wing for closing said passage window when the flap is in the closed position and a second, so-called other wing for at least partially closing said first duct when the flap is in the open position;
said gate flap includes said straight edge;
said valve further comprises a seal, said seal including an opening for the passage of the fluid, the gate wing being adapted to block said opening in the seal at least partly when the flap is in a closed position, said gate wing and the other wing being on respective opposite sides of the seal when the flap is in the closed position, and said flap comprising an intermediate area connecting said first and second wings passing through said opening in the seal;
said seal comprises a plane area having a surface against which a plane, so-called gate wing bearing face of said gate wing comes to bear and an opposite surface against which the other plane, so-called bearing face of the other wing of the flap comes to bear when the flap is in the closed position, said opening provided in the seal for the passage of the fluid being positioned at the level of said plane area;
said bearing surface of the gate wing and said bearing surface of the other wing of the flap extend in two spaced parallel planes;
said planes are spaced by a distance corresponding to the thickness of the seal in said plane area;
the other wing of the flap has a surface opposite its plane bearing surface and the intermediate area has an inclined flat between the bearing face of the gate wing and said opposite face;
in the direction of the pivot shaft of the flap, said gate wing has a dimension extending on both sides beyond the dimension over which the intermediate area extends, at least at the level of a junction area between said intermediate area and said gate wing;
said seal has a boss along a portion of the passage opening face-to-face with the other wing of the flap when the latter is in the closed position, said boss being configured to be compressed by said other wing of the flap when the latter is in the closed position;
said seal has a blind area situated face-to-face with said other wing when the flap is in the closed position;
said body includes a housing for a motor for actuating the flap, said body being configured to define an air blade between said blind area of the seal and said housing.

The invention will be better understood in the light of the following description, which is given by way of illustration only and is not intended to be limiting on the invention, and is accompanied by the appended drawings, in which.

Figure 1:
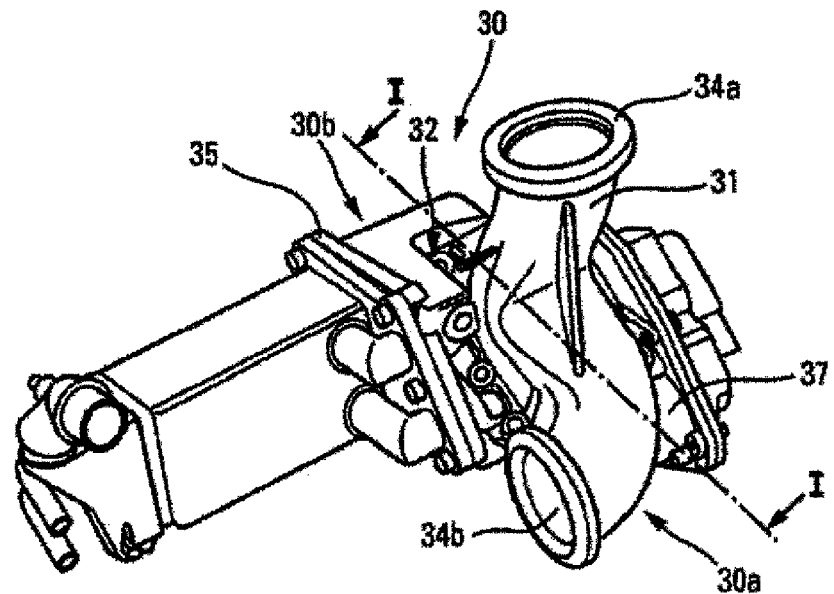
FIG. 1 is a perspective view of a valve of one embodiment of the invention.
Figure 2:
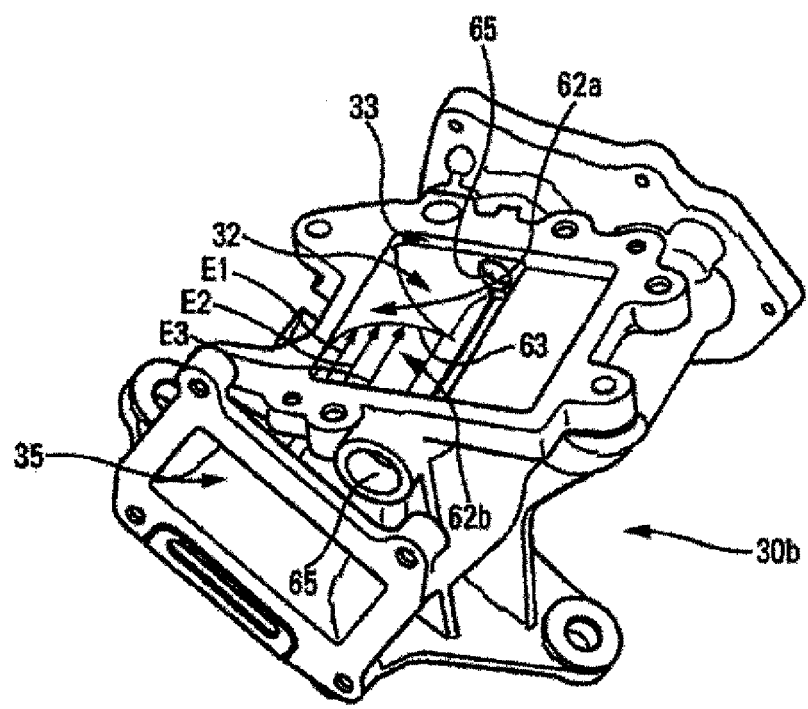
FIG. 2 is a perspective view of part of the valve from FIG. 1.
Figure 3:
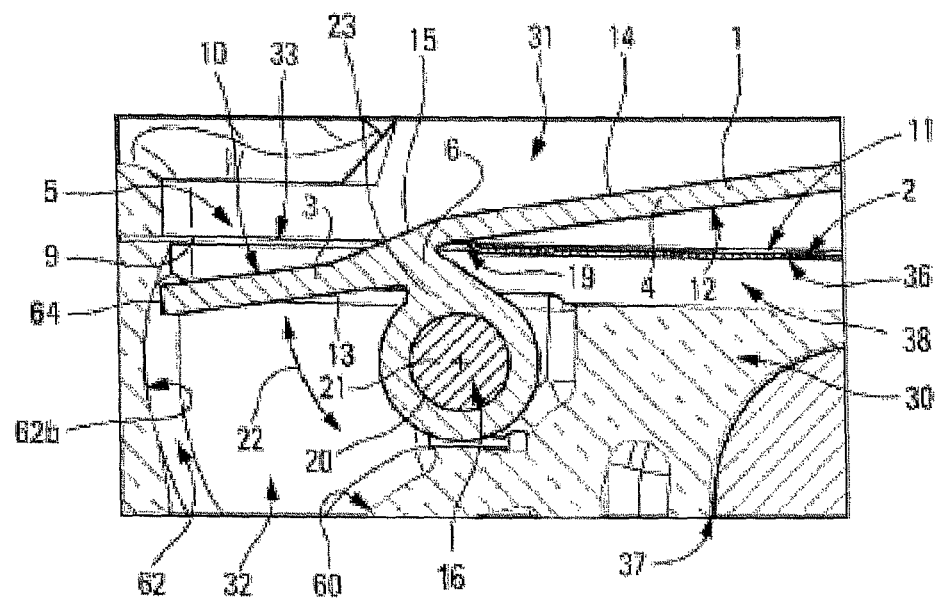
FIG. 3 is a sectional view of the valve from the previous figures, the section being taken in a section plane orthogonal to the pivot shaft of the flap, the flap being in a partially open position.

The invention concerns a fluid circulation valve, shown in FIGS. 1 to 3, in particular for the exhaust gas from an automobile vehicle motor, comprising a body 30 defining at least one duct for the flow of the fluid and a flap 1.

In the embodiment shown, said body 30 defines for the flow of the fluid a main duct 31 and an auxiliary duct 32 that extends from said main duct 31. The main duct 31 has, for example, an inlet orifice 34a and an outlet orifice 34b communicating, in one example of an application, with the exhaust line of an motor. The auxiliary duct has an orifice 35 communicating, in the same example of an application, with an exhaust gas recirculation line.

The flap 1 can rotate about a shaft 16, as shown by the arrow 22, between a so-called closed position preventing the flow of the fluid in one of the ducts and an open position allowing the flow of the fluid in said duct.

In particular, in the embodiment shown, the closed position prevents communication between the two ducts 31, 32 and the open position allows communication between said ducts 31, 32, for example at the level of a fluid passage window 33 so that the fluid is allowed to flow into the auxiliary duct 32 from said main duct 31.

In its open position, represented in FIG. 3, the flap is positioned transversely relative to said window 33. In the embodiment shown, the flap 1 is positioned so that it is inclined relative to the window 33 in its maximum open position, not shown, for example at the level of an abutment 60.

According to the invention, the valve has a opening clearance E between the flap 1 and a wall 62 of said duct for the passage of the fluid, here the duct 32, said clearance E extending in a direction parallel to the pivot shaft 16 of the flap 1, over a length that varies as a function of the angular position of the flap.

This is shown more particularly in FIG. 2, in which there is seen the clearance E shown from different values of the angular position of the flap. In the figure, three increasing values E1, E2, E3 of the opening clearance E have been marked.

The area opening up for the passage of the fluid as the flap rotates is thus no longer determined only by the opening angle and the distance between the flap and the facing wall but also by the length of the opening clearance E, which can be chosen according to the progressivity of flow to be imparted to the valve.

The length of the clearance E obeys one or more of the following laws:

it is zero in the closed position of the flap, it increases with an angle of opening of the flap, it increases in a manner that is not proportional to the angle of opening of the flap, it increases faster at the commencement of the opening of the flap than at the end, it is maximum in the maximum open position of the flap.

The wall 62 comprises, for example, a first portion 62a with which the flap is in contact, ignoring assembly clearances, between its open position and its closed position, and a second portion 62b extending in the direction of the pivot shaft of the flap from said first portion 62a. Said second portion is less concave than said first portion so as to define said opening clearance E. In other words, at the level of the portion 62a, there is no fluid passage between the wall 62 and the flap 1, or only a leakage flow, whereas the fluid can pass between the flap 1 and the wall 62 at the level of the portion 62b of the latter.

Said first portion 62a and said second portion 62b are on respective opposite sides of a curved, for example elliptical connecting line 63. This produces the laws governing the progressivity of the clearance E defined above.

As can be seen more particularly in FIG. 3, the rotation shaft 16 of the flap is off-center, for example, and the flap 1 is oriented in a plane tangential to a cylinder centered on said axis.

Said first portion 62a notably has a profile inscribed within a cylinder the axis of which is the rotation axis of the flap. Said cylinder has a radius defined by the distance between said pivot shaft 16 of the flap and a distal edge 64 of the flap 1 parallel to the pivot shaft 16 of the flap.

The wall 62 is provided, for example, at the level of the auxiliary duct 32 and the opening clearance E is situated between the edge 64 of the flap and said wall 62, at the level of its portion 62b. Said edge 64 is, for example, straight and the wall 62 of the auxiliary duct is configured to define said clearance E.

In the embodiment shown, the auxiliary duct 32 forms an elbow in the direction of the orifice 35 and the portion 62a of the wall 62, preventing the passage of the fluid, is provided on the side opposite the direction taken by the elbow, to limit head losses. Other configurations may of course be envisaged as a function of the direction imparted to the auxiliary duct 32, notably configurations in which the portion 62a of the wall 62 preventing the passage of the fluid is in more than one part.

The flap 1 is provided, for example, with a first wing 3 and a second wing 4. Said first, so-called gate wing 3 enables closing of the window 33 of the body when the flap 1 is in the closed position and said second, so-called other wing 4 enables said first duct 31 to be at least partially closed when the flap is in the open position.

Said edge 64, mobile in front of the wall 62 defining the clearance E is provided, for example, at the level of said gate wing 3. In the closed position of the flap 1, the opening clearance E is zero and the edge 64 is in contact with the wall 62 over all the length of said edge 64. In the maximum open position the opening clearance is provided, for example, all along said edge 64. In other words, there is flow of the fluid between the flap 1 and the wall 62 at the level of all the length of the edge 64. In an intermediate position, the flow occurs only at the level of a portion of said edge 64 (see FIG. 3).

Said body 30 can be produced in two parts 30a, 30b, each part defining one of said ducts 31, 32, and having an opening coming into corresponding relationship to define said window 33. This means that said two parts of the body 30 are separate, fastened together.

Said two parts 30a, 30b are castings, for example. In this respect, said portions 62a, 62b are provided at the level of one and the same part, here the portion 30b of the valve, and the connecting line 63 referred to above is an imaginary line.

A seal 2 is provided, for example, between said two portions at the level of said window 33 to serve as a seal between said two parts 30a, 30b and the exterior of the valve.

Said seal 2 includes an opening 5 for the fluid to pass from the duct 31 to the other duct 32. Said opening 5 in the seal is notably provided facing the window 33 in the body 30.

Said seal 2 notably includes a blind area 36 situated facing said other wing 4 when the flap 1 is in the closed position. In other words, the opening 5 in the seal is provided only at the level of the gate wing 3, the flap 1 being in the closed position.

In an open position of the flap, said first wing 3 and said second wing 4 lie on respective opposite sides of the seal 2, transversely thereto to allow the fluid to pass.

Figure 4:
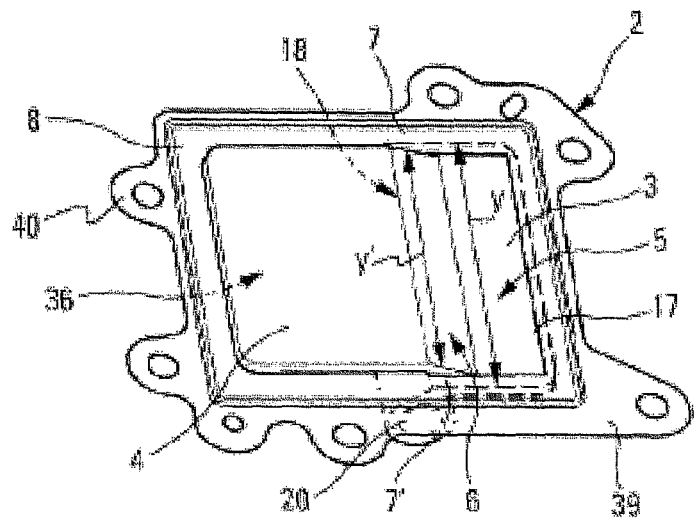
FIG. 4 is a perspective view of the seal and the flap of the valve from the previous figures, the flap being in the closed position.

As shown in FIG. 4, said gate wing 3 and the other wing 4 are provided, for example, on respective opposite sides of the seal 2, when the flap is in the closed position, and said flap 2 comprises an intermediate area 6, connecting said first wing 3 and said second wing 4, passing through said opening in the seal, for example flush with it, at the level of areas 7, 7' of the contour of said opening 5 in the seal.

Thus it is possible to produce a seal around the opening 5 in the seal at the same time as allowing the flap to move between its open position and its closed position without having to leave large clearances between the opening in the seal and the contour of the flap.

Said seal 2 comprises a plane area 8 and, referring again to FIG. 3, it is seen that said plane area has a surface 9 against which said gate wing 3 comes to bear via a plane, so-called bearing face 10 of the gate wing and/or an opposite surface 11 against which the other wing 4 of the flap comes to bear, via a plane, so-called bearing face 12 of the other wing, when the flap is in the closed position. Said opening 5 provided in the seal 2 for the fluid to pass through is positioned at the level of said plane area 8. The seal is thus produced by a face-to-face contact at the level of said wing or wings.

Said blind area 36 of the seal 2 could also be located at the level of said plane area 8 of said seal 2 in which the opening 5 in said seal is formed.

Said bearing surface 10 of the gate wing and said bearing surface 12 of the other wing of the flap extend, for example, in two spaced parallel planes, for example of a size corresponding to the thickness of the seal in said plane area 8. Plane-on-plane contacts can thus be provided.

The gate wing 3 has a surface 13, opposite its bearing surface 10, and the other wing 4 has a surface 14 opposite its bearing surface 12. These two opposite faces 13, 14 are, for example, plane and intermediate area 6 features an inclined flat 15 between the bearing face 10 of the gate wing 3 and said opposite face 14 of the other wing 4. This encourages the flow of the fluid over the surface of the flap.

Said seal 2 can have a boss 19 along a portion of the opening 5 in the seal, face-to-face with the other wing of the flap when the latter is in the closed position. Said boss is configured to be compressed by said other wing 4 of the flap when the latter is in the closed position. This further improves the seal.

The pivot shaft 16 of the flap 1 is notably situated in the vicinity of the intermediate area 6 of the flap. The flap 1 has, for example, a housing 20 for a pivot shaft 21. Said housing is located, for example, in an extension 23 of the flap notably located in the intermediate area 6. In such an embodiment, said extension 23 extends from the opposite face 13 to the bearing face 10 of the gate wing and from the bearing face 12 of the other wing 4 of the flap.

Here the housing 20 is a through-housing and the shaft 21 projects from both ends of the housing 20. The shaft 21 is connected to the extension 23 in a manner that is known in itself. It is articulated relative to the body 30 at the level of housings 65 formed therein.

The gate wing 3, the other wing 4, the intermediate area 6 and its extension 23 form a single part, for example, notably a casting.

As shown in FIG. 4, in the direction of the pivot shaft of the flap, said gate wing has a dimension y extending on both sides beyond the dimension y' of the intermediate area 6, at least at the level of a junction area between said intermediate area and said gate wing. The bearing surface 10 of the gate wing 3 can therefore have a contact area 17 in the form of an angular ring portion, with the seal 2, over a first portion of the periphery of the opening 5 in the seal, on one side of said seal, while the bearing surface 12 of the other wing 4 has, on the other side of the seal, a contact area 18 on a complementary part of the periphery of the opening 5 in the seal.

The contact area 17 provided by the gate wing 3 also extends, for example, in line with the intermediate area 6, at the level of the areas 7, 7'. This strengthens the seal and there could be an intermediate area 6 that is not flush with the contour of the opening 5 in the seal.

The opening 5 in the seal has a substantially rectangular contour, like the gate flap 3. The contact area 17 of said gate wing 3 extends along three sides of said opening. As for the contact area 18, it extends along the last side. Said intermediate area 6 is face-to-face with the contour of said opening 5 over a portion of two of its opposite sides. Said other flap 4 could also be rectangular.

The seal 2 has, for example, a peripheral portion 39 and said plane area 8 is set back from the peripheral portion. Such a seal is produced by stamping, for example. Said peripheral portion 39 could have extensions 40 forming flanges for attaching it to the body 30.

Said body 30 further comprises, for example, a housing 37 for a motor for actuating the flap. Said valve could comprise a transmission system, not shown, between an output shaft of the motor and the pivot shaft 21 of the flap.

The valve is configured so that the flap 1, notably the other wing 4 forms a heat shield for the actuator motor.

To the same end, as can be seen in FIGS. 2 and 3, said body 30 is configured to define a fluid blade 38 between said seal 2 and said housing 37, notably between said blind area 36 of the seal and said housing 37.

Figure 5:
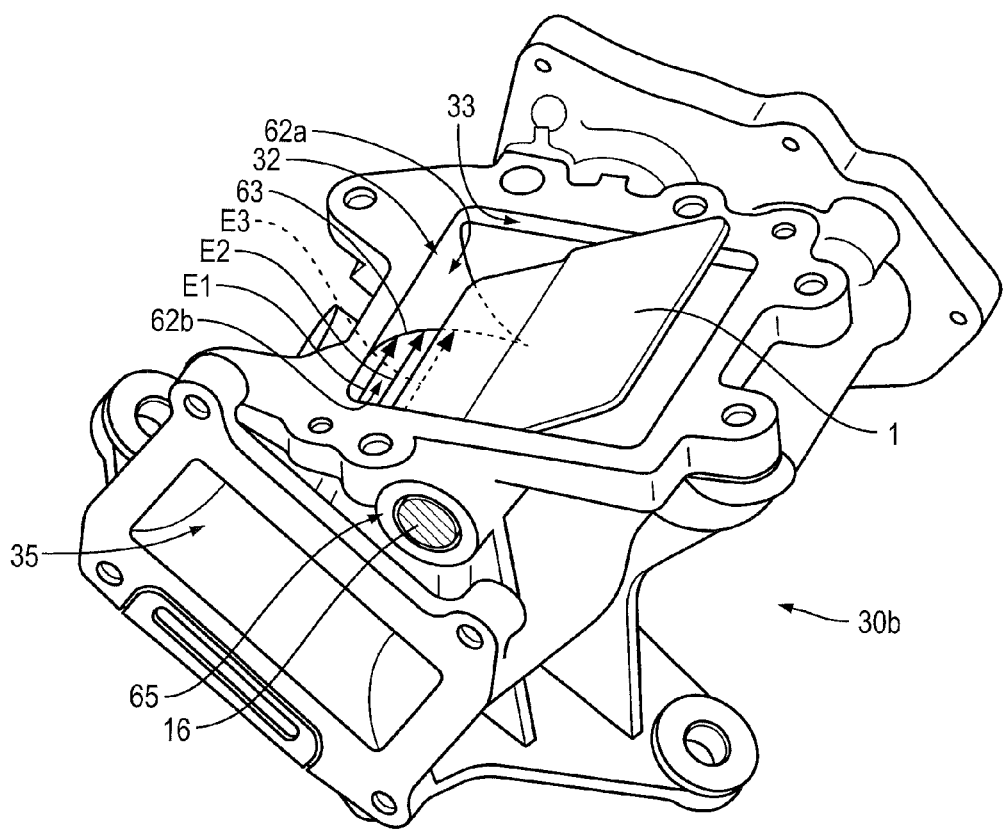
FIG. 5 is a perspective view of part of the valve from FIG. 1 with the flap in a partially open position.

Referring to FIG. 5, a perspective view of the body 30 with the flap 1 in a partially open configuration is shown. The flap 1 can rotate about a pivot shaft 16 between a closed, in which flow of the fluid is prevented in one of the ducts, and an open position, in which flow of the fluid is allowed between ducts.

As discussed above, in its open position, the flap 1 is positioned so that it is inclined relative to the window 33. Further, a wall 62 of the body 30 comprises a first portion 62*a* with which the flap 1 is in contact between its open position and its closed position, and a second portion 62*b* extending in a direction of the pivot shaft 16 of the flap 1 from the first portion 62*a*. The second portion 62*b* of the wall 62 is less concave than the first portion 62*a* of the wall 62 so as to define an opening clearance E. In other words, at the level of the first portion 62*a* of the wall 62, there is no fluid passage between the wall 62 and the flap 1, or only a leakage flow, whereas the fluid can pass between the flap 1 and the second portion 62*b* of the wall 62. Further, as discussed above, the first portion 62*a* of the wall 62 and the second portion 62*b* of the wall 62 are on respective opposite sides of a curved, for example elliptical, connecting line 63.

Additionally referring to FIG. 5, as discussed above, the opening clearance E of the valve exists between the flap 1 and the wall 62 of the body 30 for the passage of the fluid, with the opening clearance E extending in a direction parallel to the pivot shaft 16 of the flap 1, over a length that varies as a function of the angular position of the flap. The length of the opening clearance E varies due to the contact between the flap 1 and the first portion 62*a* of the wall 62 and the shape of the curved connecting line 63 that defines the first portion 62*a* of the wall 62 from the second portion 62*b* of the wall 62. Particularly, FIG. 5 shows different lengths of the opening clearance E according to different values of the angular position of the flap 1. In FIG. 5, three increasing values E1, E2, and E3 of the opening clearance E are shown with the flap being angled such that the opening clearance E is at length E2.

The invention claimed is:

1. A fluid valve for an automobile vehicle, comprising:
   a body;
   a movable flap configured to rotate about a shaft between a closed position preventing a fluid from flowing through the body of the fluid valve and an open position allowing the fluid to flow through the body of the fluid valve;
   a main duct having an inlet duct and a first outlet duct, the main duct extending from the body such that the main duct is in fluid communication with the body of the fluid valve; and
   a second outlet duct extending from the body such that the second outlet duct is in fluid communication with the body of the fluid valve,
   wherein the valve includes an opening clearance between the flap and a wall of the body for the passage of the fluid, the opening clearance having a length and a width, wherein the length of the opening clearance extends in a direction parallel to a pivot shaft of the flap and continuously varies according to an angular position of the flap between the closed position and the open position of the flap,
   wherein the flap is adapted to allow fluid communication between the inlet duct and the first outlet duct and prevent fluid communication between the inlet duct and the second outlet duct in the closed position, and
   wherein the flap is adapted to partially prevent fluid communication between the inlet duct and the first outlet duct and allow fluid communication between the inlet duct and the second outlet duct in the open position.

2. The valve as claimed in claim 1, wherein the length of the opening clearance is zero in the closed position of the flap, wherein the length of the opening clearance is a maximum in the maximum open position, and wherein the length of the opening clearance at least one of increases with an angle of an opening of the flap, increases in a manner that is not proportional to the angle of the opening of the flap, and increases faster at a commencement of the opening of the flap than at an end of the opening of the flap.

3. The valve as claimed in claim 1, wherein the wall comprises a first portion with which the flap is in contact between the open position and the closed position and a second portion extending in the direction of the pivot shaft of the flap from the first portion, the second portion being less concave than the first portion so as to define the opening clearance.

4. The valve as claimed in claim 3, wherein the pivot shaft of the flap is off-center and the flap is oriented in a plane tangential to a cylinder centered on the pivot shaft.

5. The valve as claimed in claim 3, wherein the first portion of the wall has a profile that is inscribed within a cylinder, wherein the pivot axis is located within the cylinder, and wherein an axis of rotation of the flap is an axis of the cylinder.

6. The valve as claimed in claim 1, wherein the wall is situated at a level of the second outlet duct.

7. The valve as claimed in claim 6, wherein the flap has an edge oriented along the pivot shaft at a level of which the opening clearance is provided and the edge is straight, and wherein the opening clearance is situated between the edge of the flap and the wall.

8. The valve as claimed in claim 6, wherein the flap has a first gate wing for closing a passage window between the inlet duct and the second outlet duct when the flap is in the closed position and a second gate wing for at least partially closing a fluid flow path between the inlet duct and the first outlet duct when the flap is in the open position.

9. The valve as claimed in claim 8, wherein the first gate wing of the flap includes a straight edge.

10. The valve as claimed in claim 1, wherein the fluid enters the body from the inlet duct in a first direction, wherein the fluid exits the body into the second outlet duct in a second direction, and wherein the first direction and the second direction are orthogonal.

* * * * *